(12) United States Patent
Tsuchida et al.

(10) Patent No.: US 7,801,451 B2
(45) Date of Patent: Sep. 21, 2010

(54) OPTICAL SIGNAL PROCESSING CIRCUIT

(75) Inventors: Hidemi Tsuchida, Tsukuba (JP);
Hiroshi Ishikawa, Tsukuba (JP);
Takashi Shimoyama, Tsukuba (JP);
Abedin Kazi Sarwar, Koganei (JP);
Tetsuya Miyazaki, Koganei (JP)

(73) Assignees: National Institute of Information and Communications Technology, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 520 days.

(21) Appl. No.: 11/843,093

(22) Filed: Aug. 22, 2007

(65) Prior Publication Data

US 2008/0050124 A1 Feb. 28, 2008

(30) Foreign Application Priority Data

Aug. 25, 2006 (JP) ............................... 2006-228604

(51) Int. Cl.
*H04B 10/04* (2006.01)
(52) U.S. Cl. .................. 398/201; 398/176; 398/188
(58) Field of Classification Search .............. 398/188, 398/201, 176
See application file for complete search history.

(56) References Cited

U.S. PATENT DOCUMENTS 4,817,207 A * 3/1989 Smith et al. .................. 398/185

2004/0036946 A1 * 2/2004 Webb et al. .................. 359/264

OTHER PUBLICATIONS

Hidemi Tsuchiya, et al. 10-Gb/s wavelength conversion using cross phase modulation in InGaAs/AlAsSb quantum well intersubband transition, Central Res. Lab. Hitachi, IEICE Trans., E87-C, 1134 (2004), No. 67 Applied Physics Seminer Booklet No. 3, p. 1076, Aug. 30, 2006, Ritsumeikan University.

Hiroshi Ishikawa, et al., Mechanism of TE light phase modulation by TM gate pulse in InGaAs/AlAs/AlAsSb Intersubband transition switch, No. 67 Applied Physics Seminer Booklet No., p. 1076, Aug. 30, 2006, Ritsumeikan University.

Hiroshi Ishikawa, et al., Ultrafast All-Optical Refractive Index Modulation in Intersubband Transition Switch Using InGaAs/AlAs/AlAsSb Quantum Well, Japanese Jounal of Applied Physics, vol. 46, No. 8, 2007 pp. L157-L160 (published online Feb. 16, 2007).

Hidemi Tsuchida, et al., Cross-hase-modulation-based wavelength conversion using intersubband transition in InGaAs/AlAs/AlAsSb coupled quantum wells, Optical Society of America, Optics Letters, Apr. 1, 2007, vol. 32, No. 7, pp. 751-753 (published Mar. 5, 2007).

* cited by examiner

*Primary Examiner*—Leslie Pascal
(74) *Attorney, Agent, or Firm*—Law Office of Katsuhiro Arai

(57) ABSTRACT

An optical phase modulation circuit includes an optical phase modulation element, an optical bandpass filter, and an optical directional coupler, wherein control light with a wavelength of $\lambda_C$ is coupled with probe light with a wavelength of $\lambda_P$ using the optical directional coupler and input to the optical phase modulation element, the probe light that has been phase modulated by the optical phase modulation element is extracted through the optical band pass filter, and the phase of the probe light is modulated in response to the intensity of the control light.

6 Claims, 4 Drawing Sheets

[Fig. 1]
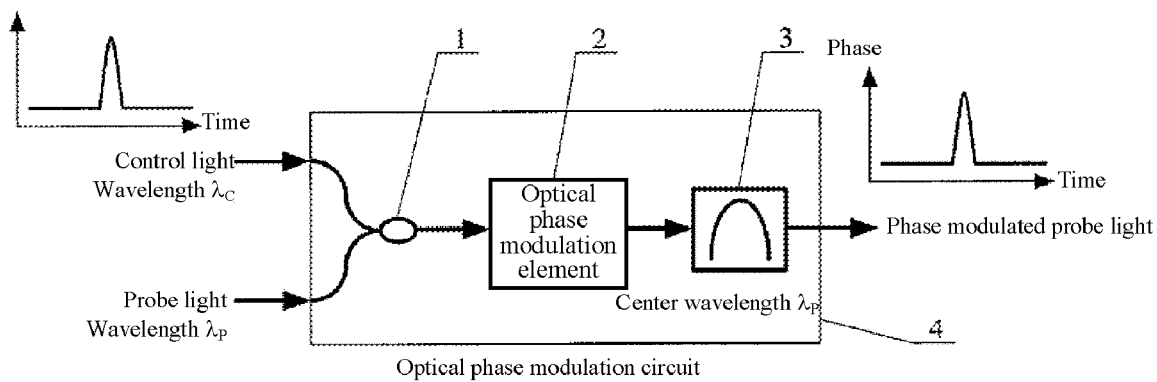
[Fig. 2]
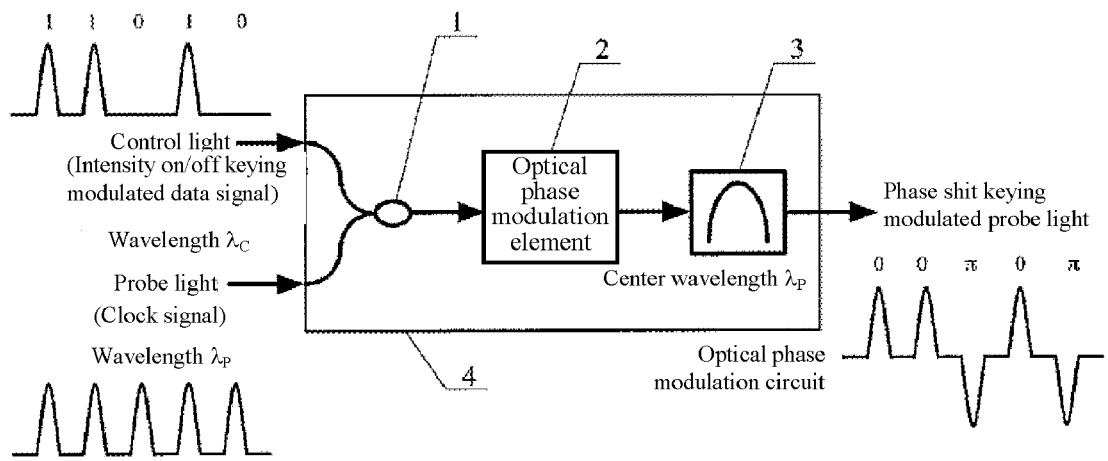
[Fig. 3]
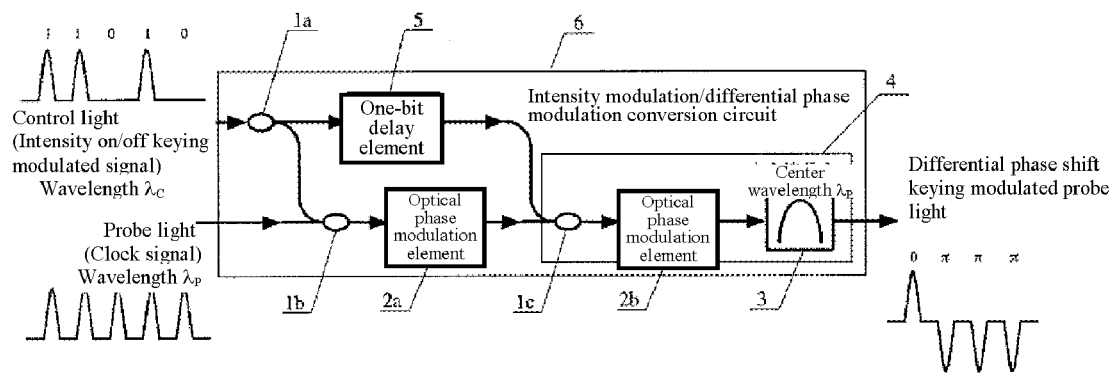

[Fig. 4]
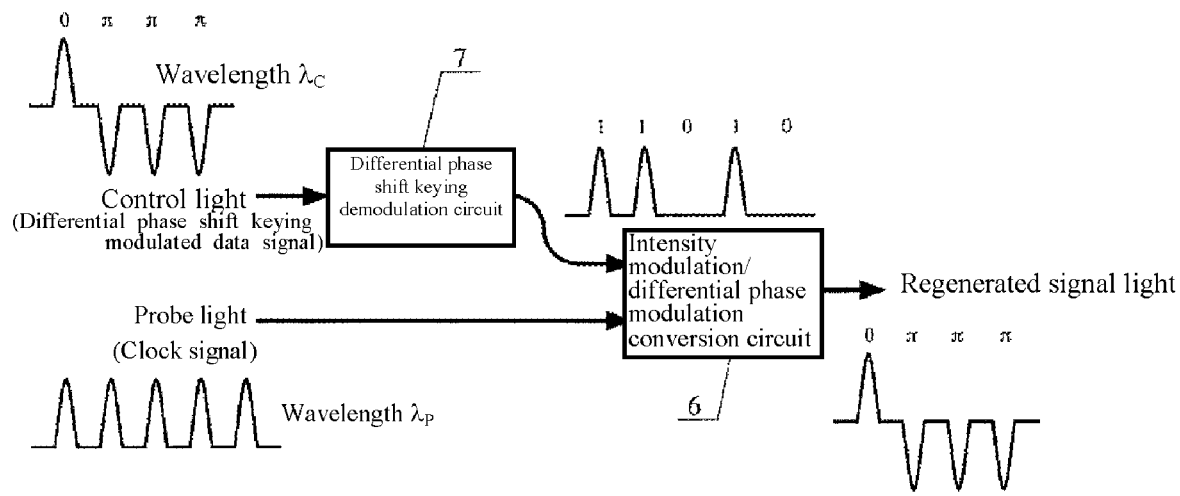
[Fig. 5]
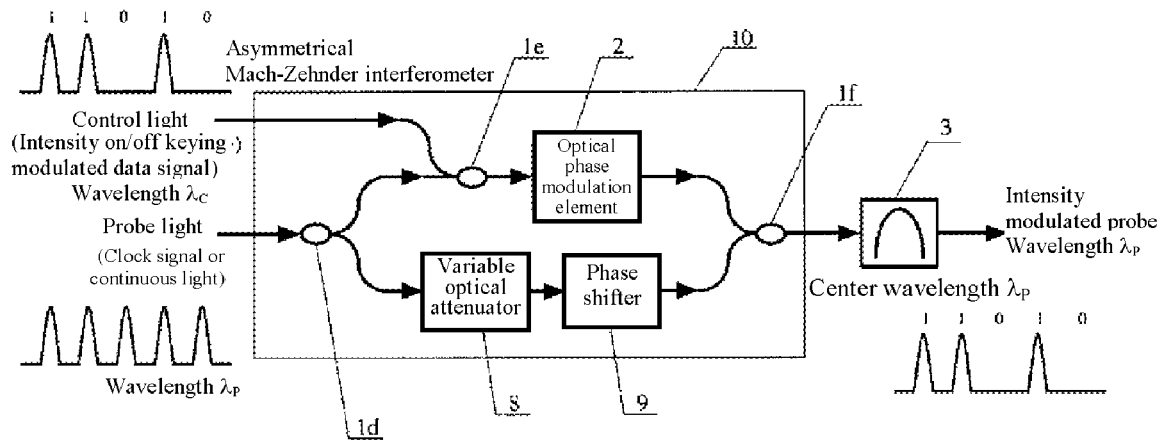
[Fig. 6]
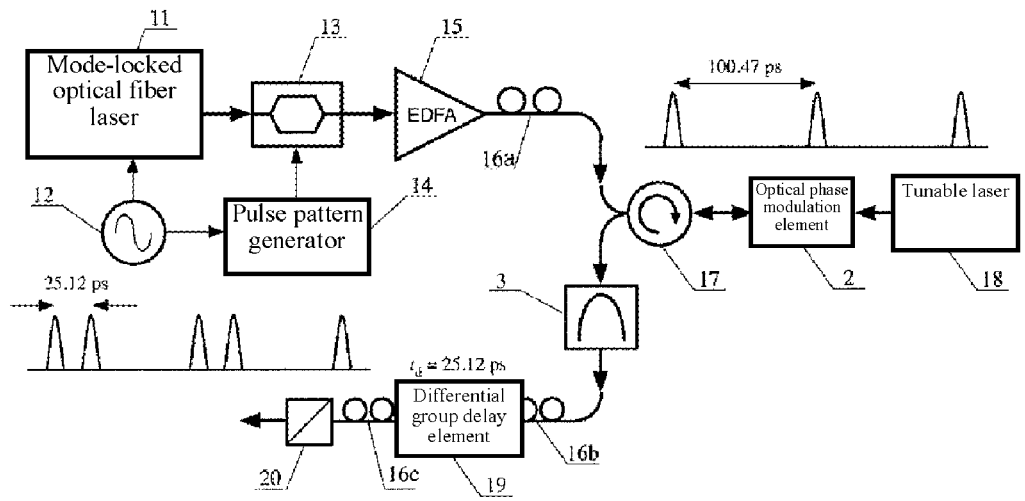

[Fig. 7]
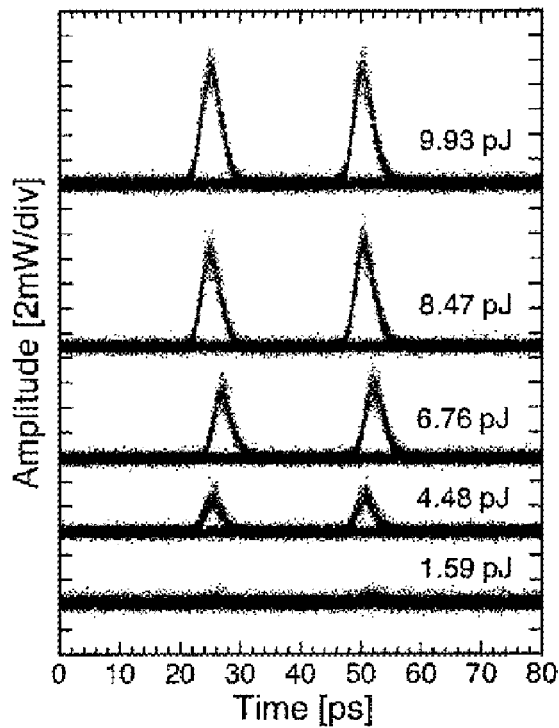
[Fig. 8]
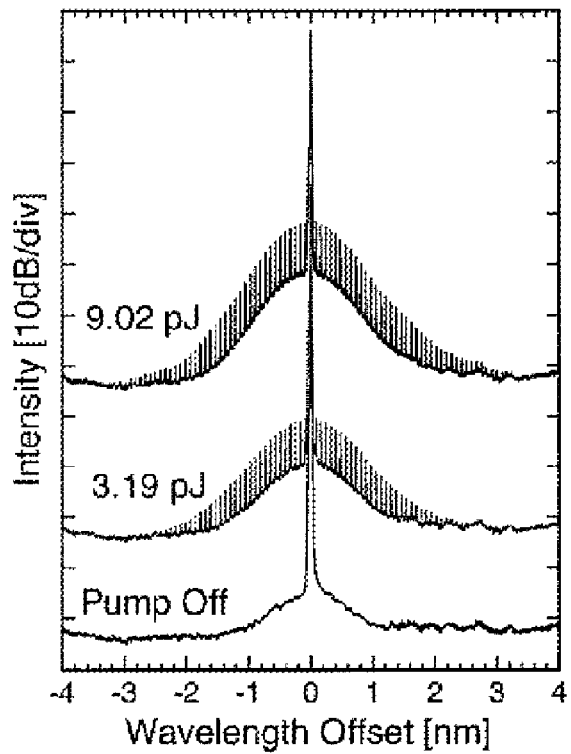

[Fig. 9]
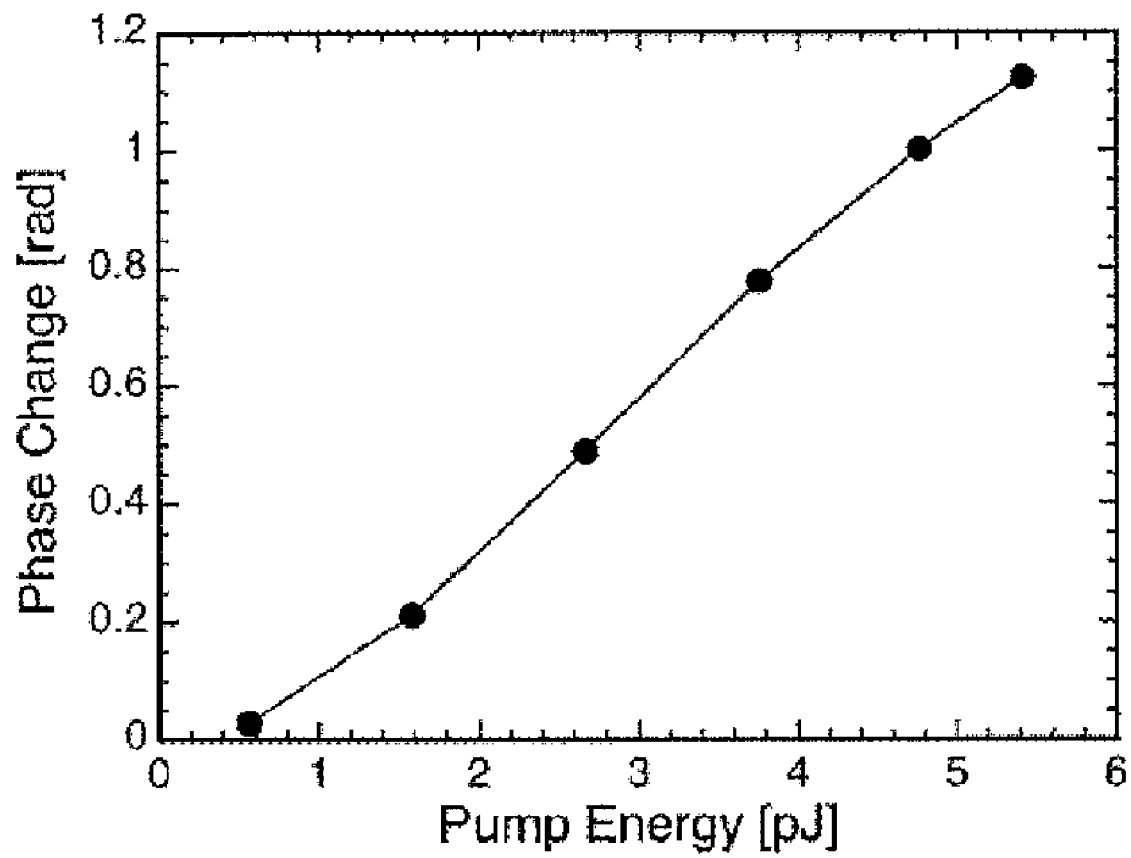

OPTICAL SIGNAL PROCESSING CIRCUIT

BACKGROUND OF THE INVENTION

1. Field of the Invention

Network nodes and other equipments in large-capacity, highly functional optical communication systems are demanding various types of processing performed on ultra-high-speed optical data signals be implemented directly in an optical domain without converting them to electrical signals. The present invention relates to all-optical signal processing technologies that are desired to be performed on ultrahigh-speed optical data signals, such as switching, regeneration and modulation format conversion.

2. Description of the Related Art

Optical communication systems are developing from technologies pertaining to simple transmission between two points, to network technologies encompassing multiple nodes. Nodes placed over a network provide various functions, including regeneration of signals deteriorated as a result of transmission, switching such as route setting, gateway to connect to other networks of different speeds and protocols, and monitoring of signal quality. Today, these series of signal processing is performed using electronic circuits. In this process, optical signals must be converted to electrical signals, and the converted electrical signals must be converted back to optical signals again. At nodes where optical signals are processed at bit rates of 10 to 160 Gb/s, however, it is difficult to implement the signal processing using traditional electronic circuits, due partly to the limited operating speeds of electronic circuits, and partly to the increased power consumptions associated with optical-to-electrical and electrical-to-optical signal conversions. For this reason, technologies that allow optical signals to be processed directly at high speed, without converting them to electrical signals, are required. To address such demand, an optical signal processing circuit having such functions as optical gate switching for switching optical signals at high speed, optical signal regeneration, and modulation format conversion, is needed. Also required is an optical signal processing circuit capable of modulating and controlling the phase of signal light using control light, because the optical signal modulation formats include not only those based on simple on/off keying of light, but also the differential phase shift keying modulation format and other formats whereby the phase of optical waves is modulated.

Pertaining to optical gate switch circuits for controlling and processing optical signals with bit rates of 10 to 160 Gb/s using another optical signals, methods combining the cross phase modulation effect of a semiconductor optical amplifier with an optical interferometer are reported, along with methods that utilize the Kerr effect in optical fibers.

For example, Patent Literature 1 proposes an optical gate switch element whose structure comprises semiconductor optical waveguides exhibiting nonlinear refractive index change against the intensity of control light, being placed symmetrically in two arms of a Mach-Zehnder interferometer. The relaxation time (switch off time) of nonlinear refractive index change occurring in a semiconductor optical waveguide is limited to several nanoseconds due to the relaxation time of the carrier. Accordingly, the element described in Patent Literature 1 utilizes optical interference to cancel the slow relaxation component and thereby achieve gate switch operation at high speed on the order of picosecond. In this configuration, however, it is difficult to match the characteristics of the semiconductor optical waveguides placed in two arms, which presents a number of problems such as a need for a circuit that compensates the differences between the two sets of characteristics.

To solve the above problems, Patent Literature 2 proposes an optical gate switch element offering excellent long-term stability, capable of achieving the same functions provided by the circuit in Patent Literature 1 with only one semiconductor optical waveguide.

However, optical phase change arising from refractive index change caused by control light is accompanied by relaxation of several nanoseconds, and therefore it is still difficult to achieve a phase modulation/control element operating at high speed, even when the optical gate switch element is realized with only one semiconductor optical waveguide.

Patent Literature 3 proposes an optical gate switch circuit of nonlinear optical loop mirror type that utilizes the Kerr effect in optical fibers. The nonlinear refractive index change occurring in optical fibers is substantially smaller than the nonlinear refractive index change occurring in semiconductor optical waveguides like those used in Patent Literatures 1 and 2. For this reason, it is necessary to use an optical fiber of several hundred meters to several kilometers in length to extend the length of interaction between control light and signal light, and the power of control light needed to implement switching also becomes higher by more than an order of magnitude. A loop is constituted by an optical fiber, and the interference between lights propagating clockwise and counterclockwise along the loop is utilized to convert to intensity change the optical phase change arising from refractive index change. The Kerr effect of an optical fiber represents a nonlinear refractive index change occurring in the optical fiber due to control light, and exhibits a high-speed response of around several hundred femtoseconds. Accordingly, it is possible to achieve switching operation at several 100 Gb/s or higher, and therefore operation of an optical phase modulation/control element at high speed is theoretically feasible. However, the need for a long optical fiber makes it difficult to adjust signal timings, and there is also a possibility of signal delay. In this sense, this method is not suitable for applications requiring size reduction and/or integration.

[Patent Literature 1] Japanese Patent Laid-open No. Hei 7-20510

[Patent Literature 2] Japanese Patent Laid-open No. Hei 8-179385

[Patent Literature 3] Japanese Patent Laid-open No. 2006-30295

SUMMARY OF THE INVENTION

An embodiment of the present invention is to provide, using semiconductor elements that permit size reduction and/or integration, a high-speed optical phase modulation circuit not accompanying slow relaxation and capable of controlling optical phase in response to light intensity, and also provide, using the aforementioned optical phase modulation circuit, a circuit for converting optical intensity on/off keying modulation to phase shift keying modulation, a circuit for converting intensity on/off keying modulation to differential phase shift keying modulation, an optical signal regeneration circuit for regenerating differential phase shift keying modulated signals, and an optical gate switch circuit that utilizes interference.

An embodiment adopts the means for solution specified below to achieve the aforementioned embodiment.

Take note that the term "optical signal processing circuit" used in this Specification refers to a circuit conforming to a general concept that encompasses "an optical phase modulation circuit, as well as a circuit for converting optical intensity on/off keying modulation to phase shift keying modulation, circuit for converting intensity on/off keying modulation to differential phase shift keying modulation, optical signal regeneration circuit for regenerating differential phase shift keying modulated signals, or optical gate switch circuit that utilizes interference, each constituted by using the aforementioned optical phase modulation circuit."

1) An optical phase modulation circuit comprises an optical phase modulation element, an optical bandpass filter, and an optical directional coupler, wherein control light with a wavelength of $\lambda_C$ is coupled with probe light with a wavelength of $\lambda_P$ using the optical directional coupler and input to the optical phase modulation element, the probe light that has been phase modulated by the optical phase modulation element is extracted through the optical bandpass filter, and the phase of the probe light is modulated in response to the intensity of the control light.

2) An intensity modulation/phase modulation conversion circuit is based on an optical phase modulation circuit according to (1) above, wherein the probe light is given as clock signal light and the intensity modulated control light with a wavelength of $\lambda_C$ is coupled with the probe light with a wavelength of $\lambda_P$ given as clock signal light using the optical directional coupler and input to the optical phase modulation element, the transmitting probe light is extracted through the optical bandpass filter, and the intensity on/off keying modulation of the control light is converted to phase shift keying modulation of the probe light.

3) An intensity modulation/differential phase modulation conversion circuit comprises a one-bit delay element, an optical bandpass filter, optical directional couplers, and an optical phase modulation circuit according to (1) above, wherein the control light is given as the control light delayed by a first optical directional coupler and one-bit delay element, the branching light from the first optical directional coupler is coupled with probe light using a second optical directional coupler, the probe light given as the coupled light output from the second optical directional coupler is phase modulated by control signals via the first optical phase modulation element to give modulated signals, the delayed control light is given as the control light of the optical phase modulation circuit according to (1) above, the phase modulated signals are given as the probe light of the optical phase modulation circuit according to (1) above, and the intensity on/off keying modulation of the control light is converted to differential phase shift keying modulation of the probe light.

4) An optical signal regeneration circuit comprises a differential phase shift keying demodulation circuit and an intensity modulation/differential phase modulation conversion circuit according to (3) above, wherein the control light given as differential phase shift keying modulated data signal light is converted to intensity on/off keying modulated data signal light via the differential phase demodulation circuit, the intensity on/off keying modulated data signal light is used as the control light to convert clock signal light to differential phase on/off keying modulated signal light using the intensity modulation/differential phase modulation conversion circuit, and the differential phase shift keying modulated data signal light is regenerated.

5) An optical gate switch circuit comprises an asymmetric Mach-Zehnder interferometer having an optical path that outputs the control light and probe light of an optical phase modulation circuit according to (1) above to a second optical directional coupler via a first optical directional coupler and an optical phase modulation element, and an optical path that connects a third optical directional coupler to which the probe light is input, to the second optical directional coupler via a variable optical attenuator and an optical phase shifter; and a bandpass filter connected to the second optical directional coupler; wherein the intensity modulated control light with a wavelength of $\lambda_C$ is input to the optical phase modulation element, the probe light with a wavelength of $\lambda_P$ being clock signal light or continuous light is input to the asymmetric Mach-Zehnder interferometer, the transmitted probe light is extracted through the optical bandpass filter, and the probe light is switched in response to the control light.

6) A circuit according to any one of (1) through (5) above, wherein the optical phase modulation circuit is an element that has a single or multiple semiconductor quantum well structure comprising the well layers and the barrier layers, the control light is given as TM polarized light that is resonant with the intersubband transition of the quantum well, and the probe light is given as TE polarized light.

In the optical gate switch elements described in Patent Literatures 1 and 2, an interferometer is used to cancel the relaxation time (switch off time) of nonlinear refractive index change occurring in a semiconductor optical waveguide, so as to convert to intensity modulation the phase modulation of the probe light caused by the control light. On the other hand, the optical signal processing circuit proposed by an embodiment of the present ensures that the nonlinear refractive index change occurring in a semiconductor exhibits high-speed response against the control light, and accordingly there is no need to remove the slow relaxation component. For this reason, the interferometer is utilized solely for the purpose of converting phase modulation to intensity modulation. As a result, the structure is simplified and stability and reliability improve significantly. In addition, the optical phase modulation element used in the optical signal processing circuit proposed by an embodiment of the present invention has no slow relaxation component, which means that the element can be operated at high speed as a phase modulation/control element. For this reason, an embodiment of the present invention achieves an intensity modulation/phase modulation conversion circuit, an intensity modulation/differential phase modulation conversion circuit, and an optical signal regeneration circuit, none of which is achievable with the optical gate switch elements described in Patent Literatures 1 and 2.

The optical gate switch circuit described in Patent Literature 3 achieves high-speed nonlinear refractive index change of optical fibers in response to the intensity of control light. However, an optical fiber of several hundred meters to several kilometers in length is needed, which presents a number of problems such as signal delay, timing adjustment difficulty, and unsuitability for applications requiring size reduction and/or integration. On the other hand, the optical signal processing circuit proposed by an embodiment of the present invention can be realized by using semiconductor elements. As a result, the problems of signal delay and timing adjustment can be solved, while size reduction and integration with other semiconductor elements become possible.

For the purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments, which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

FIG. 1 is a drawing explaining an optical phase modulation circuit conforming to an embodiment of the present invention.

FIG. 2 is a drawing explaining an intensity modulation/phase modulation conversion circuit conforming to an embodiment of the present invention.

FIG. 3 is a drawing explaining an intensity modulation/differential phase modulation conversion circuit conforming to an embodiment of the present invention.

FIG. 4 is a drawing explaining an optical signal regeneration circuit conforming to an embodiment of the present invention.

FIG. 5 is a drawing explaining an optical gate switch circuit conforming to an embodiment of the present invention.

FIG. 6 is a drawing showing an experimental apparatus used for evaluation of cross phase modulation characteristics of an optical phase modulation element.

FIG. 7 is a drawing showing optical sampling waveforms of probe lights converted to intensity modulated signals.

FIG. 8 is a drawing showing optical spectra of probe lights.

FIG. 9 is a drawing showing phase change of probe light as a function of energy per one control light pulse

DESCRIPTION OF THE SYMBOLS 1, 1a,1b,1c,1d,1e,1f Optical directional coupler
2, 2a,2b Optical phase modulation element
3 Optical bandpass filter
4 Optical phase modulation circuit
5 One-bit delay element
6 Intensity modulation/differential phase modulation conversion circuit
7 Differential phase shift keying demodulation circuit
8 Variable optical attenuator
9 Optical phase shifter
10 Asymmetric Mach-Zehnder interferometer
11 Actively mode-locked optical fiber laser
12 Synthesizer
13 Optical intensity modulator
14 Pulse pattern generator
15 Optical fiber amplifier
161, 16b,16c Polarization controller
17 Optical circulator
18 Tunable laser
19 Differential group delay element
20 Polarizer

DETAILED DESCRIPTION OF THE PREFERRED EMBODIMENT

The best mode for carrying out embodiments of the present invention is explained below in details by using drawings. In the present disclosure where conditions and/or structures are not specified, the skilled artisan in the art can readily provide such conditions and/or structures, in view of the present disclosure, as a matter of routine experimentation.

FIG. 1 illustrates an optical phase modulation circuit conforming to an embodiment of the present invention. Control light with a wavelength of $\lambda_C$ is coupled with probe light with a wavelength of $\lambda_P$ using an optical directional coupler 1 and input to an optical phase modulation element 2. The wavelength $\lambda_C$ of the control light is set in such a way that it can be removed using an optical bandpass filter 3 having a center wavelength of $\lambda_P$. The refractive index of the optical phase modulation element 2 is modulated in proportion to the intensity of the control light, and the phase of the probe light transmitted through the optical phase modulation element 2 is modulated accordingly. If pulsed light is used as the control light, the probe light is given the pulsed phase change shown in FIG. 1. The probe light transmitted through the optical phase modulation element 2 is retrieved after being passed through the optical bandpass filter 3 to remove the residual control light. Continuous light, or pulsed clock light synchronized with the control light, can be used as the probe light.

FIG. 2 illustrates an intensity modulation/phase modulation conversion circuit conforming to an embodiment of the present invention. In an intensity modulation/phase modulation conversion circuit 4, control light with a wavelength of $\lambda_C$ is coupled with probe light with a wavelength of $\lambda_P$ using an optical directional coupler 1 and input to an optical phase modulation element 2. The wavelength $\lambda_C$ of the control light is set in such a way that it can be removed using an optical bandpass filter having a center wavelength of $\lambda_P$. The control light is given as pulsed signal light that has been intensity on/off keying modulated using binary digital signals. The probe light is given as clock signal light synchronized with the control light and having the same bit rate as the control light. In the optical phase modulation element 2, the probe light is given a phase change proportional to the optical intensity of the control light, where the intensity of the control light is adjusted in such a way that when the value of optical intensity of the control light is "1," the phase change of the probe light becomes π. As the value of optical intensity of the control light changes to "0" or "1," the probe light is converted to PSK (Phase Shift Keying) modulated light whose phase has been modulated to "0" or "π," respectively. The probe light transmitted through the optical phase modulation element 2 is retrieved after being passed through the optical bandpass filter 3 to remove the residual control light.

FIG. 3 illustrates an intensity modulation/differential phase modulation conversion circuit conforming to an embodiment of the present invention.

An intensity modulation/differential phase modulation conversion circuit 6 has two optical paths, each originating from an optical directional coupler 1a to which the control light is input, to an optical directional coupler 1c. One optical path travels via a one-bit delay element 5, while the other travels via an optical directional coupler 1b and an optical phase modulation element 2a. The optical directional coupler 1c produces output through an optical phase modulation element 2b and an optical bandpass filter 3. The optical directional coupler 1c, optical phase modulation element 2b and optical bandpass filter 3 are the same as the corresponding components of the optical phase modulation circuit 4 shown in FIG. 1.

In the intensity modulation/differential phase modulation conversion circuit 6, control light with a wavelength of $\lambda_C$ is coupled with probe light with a wavelength of $\lambda_P$ using the optical directional coupler 1a and input to the optical phase modulation element 2a, and this circuit also has a structure whereby the optical phase modulation element 2b is provided in the optical path to connect the two optical phase modulation elements in series. The control light input to the second optical phase modulation element 2b is given a delay of 1 bit, relative to the control light input to the first optical phase modulation element 2a, by means of the one-bit delay element 5. The wavelength $\lambda_C$ of the control light is set in such a way that it can be removed using the optical bandpass filter 3 having a center wavelength of $\lambda_P$. The control light is given as optical pulsed signals that have been intensity on/off keying modulated using binary digital signals. The probe light is given as clock signals synchronized with the control light and having the same bit rate as the control light. In the respective optical phase modulation elements 2a,2b, the probe light is given a phase change proportional to the optical intensity of the control light, where the intensity of the control light is adjusted in such a way that when the value of optical intensity of the control light is "1," the phase change of the probe light becomes π. As the value of optical intensity of the control light changes to "0" or "1" in the respective optical phase modulation elements 2a,2b, the probe light is given a phase change corresponding to "0" or "π," respectively. By connecting the two optical phase modulation elements 2a,2b in series, it becomes possible to give phase modulation corresponding to the difference between the logical values of two consecutive control light bits, and consequently the probe light is converted to DPSK (Differential Phase Shift Keying) modulated light. The probe light transmitted through the second optical phase modulation element 2b is retrieved after being passed through the optical bandpass filter 3 to remove the residual control light.

FIG. 4 illustrates an optical signal regeneration circuit conforming to an embodiment of the present invention. This optical signal regeneration circuit provides a function to all-optically regenerate deteriorated differential phase shift keying modulated signals without converting them to electrical signals. The intensity modulation/differential phase modulation conversion circuit 6 is the same as the intensity modulation/differential phase modulation conversion circuit shown in FIG. 3. The control light with a wavelength of $\lambda_C$ is given as optical pulsed signals that have been differential phase shift keying modulated. The probe light with a wavelength of $\lambda_P$ is given as clock signals synchronized with the control light and having the same bit rate as the control light. The control light is input to a differential phase demodulation circuit 7 and converted to intensity on/off keying modulated signals.

The differential phase shift keying demodulation circuit 7 can be realized by, for example, using a Mach-Zehnder interferometer having a delay corresponding to one bit period of the control light.

Following the same principles applicable to the intensity modulation/differential phase modulation conversion circuit 6 in FIG. 3, the control light that has been converted to intensity on/off keying modulated signals by the differential phase shift keying demodulation circuit 7 is input to the intensity modulation/differential phase modulation conversion circuit 6. In the meantime, the probe light input simultaneously with the control light is converted to differential phase shift keying modulated light, and the information of the control light is transferred onto the probe light and regenerated.

FIG. 5 illustrates an optical gate switch circuit conforming to an embodiment of the present invention.

The optical gate switch circuit has a structure comprising an optical bandpass filter 3 connected to the output side of an asymmetric Mach-Zehnder interferometer 10.

The asymmetric Mach-Zehnder interferometer 10 has one optical path that originates from an optical directional coupler 1d to which probe light is input, travels via an optical directional coupler 1e and an optical phase modulation element 2, and connects to an optical directional coupler 1f, as well as another optical path that connects to the optical directional coupler 1f via a variable optical attenuator 8 and an optical phase shifter 9, where the optical directional coupler 1e has a structure capable of accepting input of control light. The optical directional coupler 1f is connected to an optical bandpass filter 3.

The probe light is divided into two by the optical directional coupler 1d, after which the divided lights are transmitted through the two optical paths of the asymmetrical Mach-Zehnder interferometer 10, respectively, and then coupled by the optical directional coupler 1f. The transmittance of the variable optical attenuator 8 is adjusted so that the two probe lights transmitting through the optical paths of the asymmetric Mach-Zehnder interferometer 10 have the same intensity. The phase delay of the optical phase shifter 9 is adjusted so that the two probe lights transmitting through the optical paths of the asymmetric Mach-Zehnder interferometer 10 have a phase difference corresponding to π(180°) if no control light is input. The probe lights transmitted through the asymmetric Mach-Zehnder interferometer 10 are retrieved after being passed through the optical bandpass filter 3 to remove the residual control light.

If no control light is input, the probe light is cancelled by means of interference and the output side of the asymmetric Mach-Zehnder interferometer 10 does not output any probe light. If intensity modulated data signal light is input as the control light, the control light causes phase modulation of the probe light and the phase modulation is converted to intensity modulation by means of interference, where the asymmetrical Mach-Zehnder interferometer 10 operates as an optical gate switch. Continuous light, or pulsed clock light synchronized with the control light, can be used as the probe light to support optical wavelength conversion and optical signal regeneration. In the optical gate switch circuit shown in FIG. 2, the asymmetric Mach-Zehnder interferometer 10 is used to convert phase modulation to intensity modulation, and no function is needed to cancel the slow relaxation component as required in Patent Literatures 1 and 2.

In the optical signal processing circuits shown in FIG. 1 through FIG. 5, the optical phase modulation element 2 is a single or multiple semiconductor quantum well structure consisting of the well layers and the barrier layers. As the control light, TM polarized light that is resonant with intersubband transition is used to cause refractive index change in the semiconductor by means of absorption of the control light due to intersubband transition. In addition, the optical phase modulation element operates in such a way that, through this refractive index change, the phase of the probe light given as TE polarized light is modulated, and therefore operates as an optical phase modulation device for the probe light through the intensity of the control light. Materials that have intersubband transition in the optical communication wavelength band include those having the semiconductor quantum well structures described in Non-patent Literatures 1 through 3. The optical phase modulation element can operate in the form of a waveguide device to confine the lights.

[Non-patent Literature 1] H. Yoshida, T. Shimoyama, A. V. Gopal, J. Kasai, T. Mozume, and H. Ishikawa, "Ultrafast all optical switching and modulation using intersubband transitions in coupled quantum well structures," IEICE Trans. Electron., Vol. 87-C, No. 7, pp. 1134-1141 (2004).

[Non-patent Literature 2] R. Akimoto, B. S. Li, K. Akita, and T. Hasama, "Subpicosecond saturation of intersubband absorption in (CdS/ZnSe)BeTe quantum well waveguides at telecommunication wavelength," Appl. Phys. Lett., Vol. 87, No. 18, 181104 (2005).

[Non-patent Literature 3] N. Iizuka, K. Kaneko, and N. Suzuki, "Sub-picosecond all-optical gate utilizing GaN intersubband transition," Opt. Exp., Vol. 13,No. 10,pp. 3835-3840 (2005).

The results of an experiment on cross phase modulation, implemented by means of intersubband transition using an optical phase modulation element having a multiple semiconductor quantum well structure, are reported below.

The optical phase modulation element used in the experiment had a coupled quantum well structure based on InGaAs/AlAs/AlAsSb compound semiconductors. The specific composition and structure are described in Non-patent Literature 1.

FIG. 6 illustrates the configuration of the experimental apparatus used to evaluate the phase modulation characteristics of the optical phase modulation element 2. An actively mode-locked optical fiber laser 11 was used as a light source for control light. The actively mode-locked optical fiber laser 11 was driven by a synthesizer 12 to stably generate optical clock signals with a repetition frequency of 9.95328 GHz, duration of 2.3 ps and center wavelength of 1,550 nm. The optical clock signals were input to an optical intensity modulator 13 driven by a pulse pattern generator 14 that was synchronized with the synthesizer 12, to generate digitally modulated control light. The control light was amplified with an optical fiber amplifier 15, set as TM polarized light using a polarization controller 16a, and input to the optical phase modulation element 2 via an optical circulator 17.

As shown in FIG. 6, the control light is digitally modulated signal with a period of 100.47 ps. A tunable laser 18 was used as a light source for probe light. The light output from the tunable laser 18 was set as TE polarized light, and input to the optical phase modulation element 2 from the direction opposite to the control light. The probe light transmitted through the optical phase modulation element 2 was extracted via the optical circulator 17, and after the removal of the unnecessary control light with an optical bandpass filter 3 polarization of the probe light was adjusted using a polarization controller 16b and was input to a differential group delay element 19 having a delay time of 25.12 ps between two orthogonal polarized components. The probe light transmitted through the differential group delay element 19 was polarization adjusted using an polarization controller 16c,and was input to a polarizer 20, after which phase modulation was converted to intensity modulation utilizing the interference between two orthogonally polarized components. As shown in FIG. 6, the probe light transmitted through the polarizer 20 comprised of digitally modulated signals where two consecutive pulses having a time interval of 25.12 ps were repeated in a period of 100.47 ps. Ideally the asymmetrical Mach-Zehnder interferometer 10 shown in FIG. 5 should be used. Since it was difficult to constitute a stable interferometer using individual bulk components, however, an interferometer between orthogonal polarized lights was used.

FIG. 7 shows optical sampling waveforms of probe lights converted to intensity modulated signals. The horizontal axis of the graph in FIG. 7 represents time [ps], while the vertical axis represents amplitude [2 mW/div]. The waveforms shown in FIG. 7 are those of probe lights with the energy per one control light pulse set to 1.59 pJ, 4.48 pJ, 6.76 pJ, 8.47 pJ and 9.93 pJ, respectively, from the waveform at the bottom. These waveforms show two consecutive pulses with an interval corresponding to the delay time of 25.12 ps of the differential group delay element 19, which indicates that the phase modulation caused by the control light in the probe light was converted to intensity modulation.

Each waveform shown in FIG. 7 has an eye pattern. These eye-patterned waveforms have the characteristics of sampled data superimposed onto each other along the time axis, where the wider the space between the peak and bottom, the better the quality, and the amplitude corresponds to the magnitude of phase change. Judging from these characteristics, the probe light with a control light energy of 9.93 pJ provides the highest quality.

FIG. 7 indicates that when the energy of control light increases, the intensity modulation of probe light increases and the phase modulation of probe light also increases. When the energy per one control light pulse is 6.76 pJ or more, intensity modulated signals with a clear eye pattern were obtained, suggesting that possible application as an optical gate switch circuit.

FIG. 8 shows optical spectra of probe lights, where the horizontal axis represents wavelength offset [nm], while the vertical axis represents intensity [10 dB/div]. The spectra shown in FIG. 8 were measured under conditions where no control light was input (Pump Off) and the energy per one control light pulse was set to 3.19 pJ and 9.02 pJ. When control light was input, many sidebands are generated around the carrier due to the phase modulation of the probe light caused by the control light. Also, the sideband amplitude of the probe light increased with the energy of the control light. The sideband interval was 9.95328 GHz, which corresponds to the bit rate of the control light.

FIG. 9 shows the phase change of the probe light caused by the control light as a function of energy per one control light pulse, where the horizontal axis represents pump energy (control light energy) [pJ], while the vertical axis represents phase change [rad]. The phase change of the probe light was roughly proportional to the energy per one control light pulse and increased at a rate of 0.234 rad/pJ. The energy per one control light pulse needed to give the probe light a phase change corresponding to $\pi$ is estimated as 13.4 pJ, which is equivalent to an average power of 67.1 mW for 10-Gb/s optical digital signals. Accordingly, the aforementioned intensity modulation/phase modulation conversion circuit, intensity modulation/differential phase modulation conversion circuit and optical signal regeneration circuit, all of which require a phase change of $\pi$ for the probe light, can be realized using the optical phase modulation element 2 used in the experiment.

As described above, an embodiment of the present invention is able to provide, using semiconductor elements that permit size reduction and/or integration, a high-speed optical phase modulation circuit not accompanying slow relaxation, as well as a circuit for converting optical intensity modulation to phase modulation, a circuit for converting intensity modulation to differential phase modulation, an optical signal regeneration circuit for regenerating differential phase shift keying modulated signals, and an optical gate switch circuit that utilizes interference, and these results of the experiment indicate the effectiveness of the embodiments of the present invention.

The optical signal processing circuit proposed by an embodiment of the present invention allows for realization, using semiconductor elements that permit size reduction and/or integration, of a high-speed optical phase modulation circuit not accompanying slow relaxation, which was unachievable with conventional optical gate switch circuits. As a result, various types of processing performed on ultrahigh-speed optical data signals with bit rates of 10 to 160 Gb/s, such as switching, regeneration and modulation format conversion; can be implemented directly on optical signals without converting them to electrical signals. When applied to optical communication systems, this technology concept can contribute to further performance improvement of these systems.

The present application claims the benefit of Japanese Patent Application No. 2006-228604, filed Aug. 25, 2006, the disclosure of which is incorporated by reference in its entirety.

Although all possible variations are not listed herein, the present invention can be embodied in any modes incorporating various changes, modifications and improvements based on the knowledge of those skilled in the art. It goes without saying that these embodiments are also included in the scope of the present invention, as long as they do not deviate from the purpose of the present invention.

What is claimed is:

1. An intensity modulation/differential phase modulation conversion circuit comprising:
   an optical phase modulation element;
   a one-bit delay element;
   optical directional couplers; and
   an optical phase modulation circuit comprising:
   an optical phase modulation element;
   an optical band pass filter; and
   an optical directional coupler;
   wherein control light with a wavelength of $\lambda_C$ is coupled with probe light with a wavelength of $\lambda_P$ using the optical directional coupler and input to the optical phase modulation element, the probe light that has been phase modulated by the optical phase modulation element is extracted through the optical band pass filter, and the phase of the probe light is modulated in response to the intensity of the control light; and
   wherein the control light is given as the control light delayed by a first optical directional coupler and the one-bit delay element; the branching light from the first optical directional coupler is coupled with probe light using a second optical directional coupler; the probe light given as the coupled light output from the second optical directional coupler is phase modulated by control signals via the first optical phase modulation element to give modulated signals; the delayed control light is given as the control light of the optical phase modulation circuit; the phase modulated signals are given as the probe light of the optical phase modulation circuit; and intensity on/off keying modulation of the control light is converted to differential phase shift keying modulation of the probe light.

2. An optical signal regeneration circuit comprising:
   a differential phase shift keying demodulation circuit; and
   an intensity modulation/differential phase modulation conversion circuit according to claim 1;
   wherein the control light given as differential phase shift keying modulated data signal light is converted to intensity modulated data signal light via the differential phase demodulation circuit; the intensity on/off keying modulated data signal light is used as the control light to convert clock signal light to differential phase modulated signal light using the intensity modulation/differential phase modulation conversion circuit; and the differential phase shift keying modulated data signal light is regenerated.

3. The circuit according to claim 1, wherein the optical phase modulation circuit is an element that has a single or multiple semiconductor quantum well structure comprising the well layer and the barrier layer, the control light is given as TM polarized light that is resonant with the intersubband transition of the quantum well, and the probe light is given as TE polarized light.

4. The circuit according to claim 2, wherein the optical phase modulation circuit is an element that has a single or multiple semiconductor quantum well structure comprising the well layer and the barrier layer, the control light is given as TM polarized light that is resonant with the intersubband transition of the quantum well, and the probe light is given as TE polarized light.

5. An optical phase modulation circuit comprising:
   an optical phase modulation element;
   an optical band pass filter; and
   an optical directional coupler;
   wherein control light with a wavelength of $\lambda_C$ is coupled with probe light with a wavelength of $\lambda_P$ using the optical directional coupler and input to the optical phase modulation element, the probe light that has been phase modulated by the optical phase modulation element is extracted through the optical band pass filter, and the phase of the probe light is modulated in response to the intensity of the control light, and
   wherein the optical phase modulation circuit is an element that has a single or multiple semiconductor quantum well structure comprising the well layers and the barrier layers, the control light is given as TM polarized light that is resonant with the intersubband transition of the quantum well, and the probe light is given as TE polarized light.

6. An optical phase modulation circuit comprising:
   an optical phase modulation element;
   an optical band pass filter; and
   an optical directional coupler;
   wherein control light with a wavelength of $\lambda_C$ is coupled with probe light with a wavelength of $\lambda_P$ using the optical directional coupler and input to the optical phase modulation element, the probe light that has been phase modulated by the optical phase modulation element is extracted through the optical band pass filter, and the phase of the probe light is modulated in response to the intensity of the control light,
   wherein the probe light is given as clock signal light; intensity modulated control light with a wavelength of $\lambda_C$ is coupled with the probe light with a wavelength of $\lambda_P$ given as clock signal light using the optical directional coupler and input to the optical phase modulation element; and the transmitting probe light is extracted through the optical band pass filter, and intensity on/off keying modulation of the control light is converted to phase shift keying modulation of the probe light, and
   wherein the optical phase modulation circuit is an element that has a single or multiple semiconductor quantum well structure comprising the well layer and the barrier layer, the control light is given as TM polarized light that is resonant with the intersubband transition of the quantum well, and the probe light is given as TE polarized light.

* * * * *

UNITED STATES PATENT AND TRADEMARK OFFICE
CERTIFICATE OF CORRECTION

PATENT NO. : 7,801,451 B2
APPLICATION NO. : 11/843093
DATED : September 21, 2010
INVENTOR(S) : Hidemi Tsuchida et al.

It is certified that error appears in the above-identified patent and that said Letters Patent is hereby corrected as shown below:

In Claim 1 in line 25 of column 11, in Claim 1 in line 32 of column 11, in Claim 5 in line 17 of column 12, in Claim 5 in line 24 of column 12, in Claim 6 in line 36 of column 12, and in Claim 6 in line 43 of column 12, and in Claim 6 in line 52 of column 12, please delete the two-word term "band pass" and insert the single word --bandpass-- therefor.

Signed and Sealed this

Twenty-third Day of November, 2010

David J. Kappos
*Director of the United States Patent and Trademark Office*